United States Patent [19]
Moertel

[11] 3,975,802
[45] Aug. 24, 1976

[54] SLIDER FASTENER AND STRINGER

[75] Inventor: George B. Moertel, Crawford, Pa.

[73] Assignee: Textron, Inc., Providence, R.I.

[22] Filed: Jan. 9, 1975

[21] Appl. No.: 539,642

[52] U.S. Cl. ............. 24/205.16 C; 24/205.16 D; 24/205.13 C
[51] Int. Cl.² .............. A44B 19/40; A44B 19/12
[58] Field of Search ............ 24/205.16 C, 205.13 C

[56] References Cited
UNITED STATES PATENTS

| 1,609,487 | 12/1926 | Marinsky | 24/205.16 C |
| 1,937,297 | 11/1933 | Sundback | 24/205.13 C |
| 2,018,099 | 10/1935 | Sundback | 24/205.13 C |
| 3,430,304 | 3/1969 | Swainson | 24/205.1 C |
| 3,517,422 | 6/1970 | Uhrig | 24/205.16 C |
| 3,854,174 | 12/1974 | Yoshida | 24/205.16 C |

FOREIGN PATENTS OR APPLICATIONS

| 452,527 | 5/1913 | France | 24/205.13 C |
| 1,135,269 | 4/1957 | France | 24/205.13 C |

Primary Examiner—Paul P. Gelak

[57] ABSTRACT

A stringer for a slide fastener is formed by assembling head portions of a spiral coupling element through slots in a support member which is folded and secured to retain the spiral coupling element by strap portions between the slots extending at an oblique angle to the folded edge.

15 Claims, 12 Drawing Figures

SLIDER FASTENER AND STRINGER

BACKGROUND OF THE INVENTION

1. Field of the Invention

The invention relates to slide fastener stringers and to their method and apparatus of manufacture wherein each stringer has head portions of a continuous filament coupling element extending from slots in a folded edge of a support member.

2. Description of the Prior Art

The prior art, as exemplified in U.S. Pat. No. 1,557,303, No. 1,933,390, No. 1,937,297, and No. 3,430,304 and British Patent Specification No. 1,161,016, contains a number of slide fasteners having continuous chains of coupling elements or the like secured within a fold of a carrier tape wherein the head portions of the coupling elements extend from slots across the folded edge of a leather or fabric strip or extend from apertures formed by weft threads and a wide spacing between warp threads of woven carrier tape. The prior art slots and apertures extend perpendicular to the folded edge of the carrier tape; such perpendicular slots in slide fasteners employing spiral or coil type fastening elements result in excessive distortion and relatively inferior support for the spiral coupling elements.

SUMMARY OF THE INVENTION

The invention is summarized in that a stringer for a slide fastener includes a support member formed from a material folded at one edge and secured together; the support member having a plurality of spaced slots formed in the material transversely over the one edge defining looped strap portions extending over the one edge between the slots; a spiral coupling element formed from a continuous filament into successive convolutions; each convolution having a head portion extending from the one edge of the support member, a pair of leg portions extending from opposite sides of the head portion into a respective slot in the one edge, and a heel portion extending through a looped strap portion and interconnecting to a leg portion of an adjacent convolution; and the slots being formed in the support member at an oblique angle to the one edge such that opposite halves of each slot receive the respective leg portions of each pair of leg portions at respective longitudinally spaced points on the one edge of the support member.

An object of the invention is to construct a low cost and reliable slide fastener which employs stringers formed by folding support members with slots over spiral coupling elements.

Another object of the invention is to provide relatively broad and dimensionally stable strap portions between slots of a stringer carrier for securing heel portions of a spiral coupling element.

It is also an object of the invention to minimize distortion and to distribute stress over the width of strap portions securing spiral coupling elements.

An advantage of the invention is that there is made possible a low cost slide fastener employing spiral type coupling elements with strengths sufficient to withstand forces exerted in garments and the like.

A feature of the invention is that looped strap portions securing heel portions of a spiral coupling element are formed at an oblique angle to the folded edge of the carrier so that the twist imparted to the strap portions by the heel portions is in the direction of the slot from a line running in the carrier perpendicular to the folded edge.

Other objects, advantages and features of the invention will be apparent from the following description of the preferred embodiments taken in conjunction with the accompanying drawings.

DESCRIPTION OF THE PREFERRED EMBODIMENT

Figure 1:
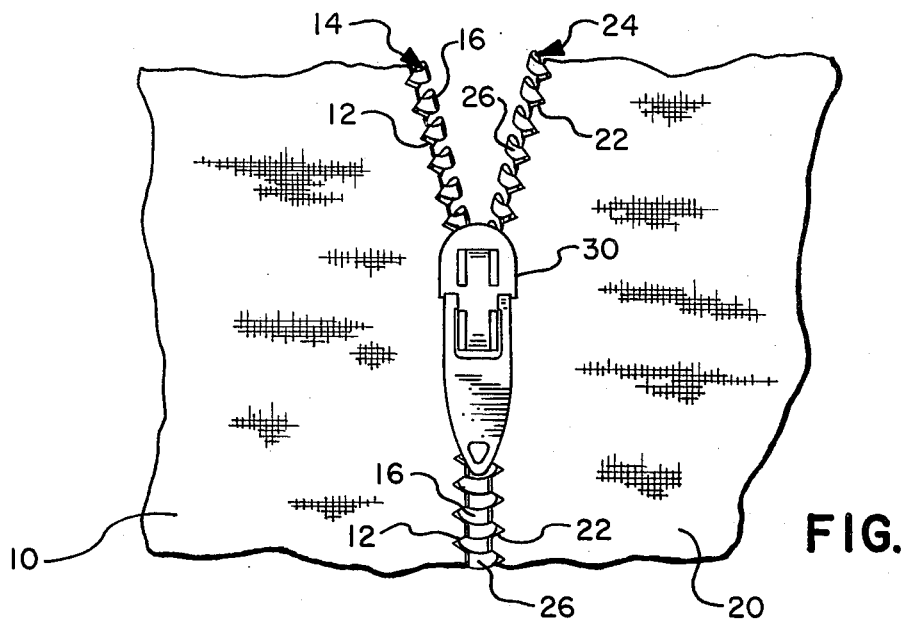
FIG. 1 is a plan view of a slide fastener in accordance with the invention.

As illustrated in FIG. 1, the invention is embodied in a slide fastener having planarly disposed support members 10 and 20 and spiral coupling elements, indicated generally at 14 and 24, along with a slider 30 which is slidable along the coupling elements 14 and 24 for opening and closing interlocking head portions 16 and 26 of the respective coupling elements 14 and 24.

Figures 2, 3, 4:
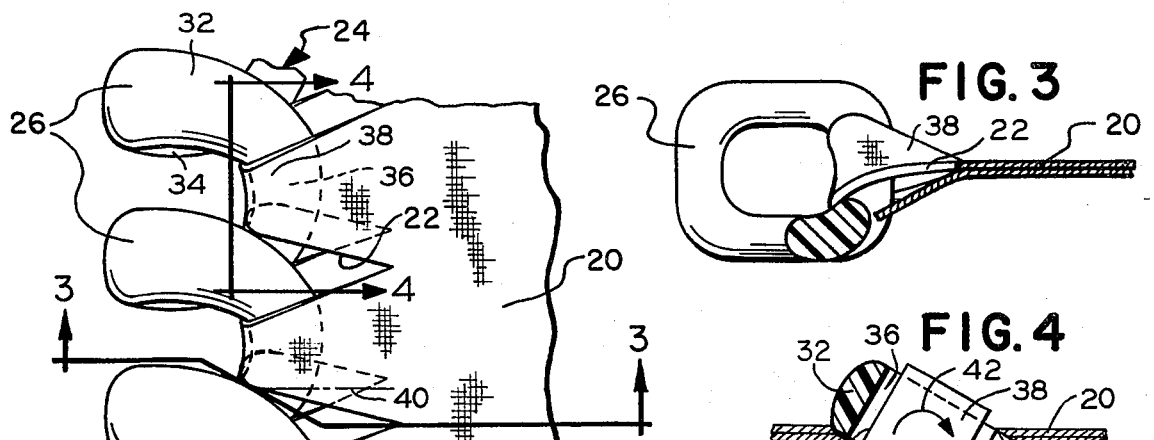
FIG. 2 is a plan view of a portion broken away and enlarged from FIG. 1.
FIG. 3 is a cross section view taken along line 3—3 of FIG. 2.
FIG. 4 is a partial sectional view taken along line 4—4 of FIG. 2.

The spiral coupling elements 14 and 24 are formed into successive convolutions from respective continuous filaments, such as nylon or polyester monofilaments, which have an oblate cross section, such as a D-shaped cross section. As shown in FIG. 2, each convolution of the coupling element 24 includes along with the head portion 26 an upper leg portion 32 and a lower leg portion 34 extending from respective upper and lower sides of the head portion 26, and a connecting or heel portion 36 interconnecting the upper leg portion 32 to a lower leg portion 34 of a contiguous convolution. The coupling element 16 is similar to the coupling element 26 except that the direction of the spiral is reversed.

The support members 10 and 20 are formed from thin or sheet-like material which is relatively stable in lengthwise and width dimensions but is sufficiently flexible to allow easy operation of the slide fastener. Where used in a garment, the support members 10 and 20 may be portions of the garment, or the support members 10 and 20 may be tape-like members which can be secured by suitable means to an opening in an article or garment. The support members 10 and 20 can be formed from a felted or non-woven fibrous material, such as paper used in making paper garments, from textile materials, from plastic materials, etc.

As shown in FIGS. 2 and 3, the material of the support member 20 is folded to form an edge adjacent the member 10. Slots 22 are formed in the material of the support members 20 and extend transversely over the folded edge to form looped strap portions 38 through which the heel portions 36 of the coupling element 24 extend. The opposite portions or halves of the folded material is secured together by suitable means, such as adhesive, ultrasonic, or thermal bonding to secure the coupling element 24 to the folded edge of the member 10. The strap portions 38 have a width substantially greater than the width of the slots 22.

The slots 22 are formed at an oblique angle to the folded edge of the member 20 such that the leg portions 32 and 34 of each convolution extend into opposite halves of a respective slot 22 at points spaced longitudinally along the folded edge of the member 20. As shown in FIGS. 3 and 4, the heel portions 36 extend at an oblique angle to the plane of the member 20. The direction of the oblique angle of the slots 22 from a line 40 perpendicular to the folded edge and along the plane of the member 20 is substantially the same direction of a tangential continuation parallel to the member 20 of the twist, indicated at 42, imparted to the strap portion 38 by the heel portion 36. The slots 22 can be formed at such an angle that the strap portions 38 extend perpendicular to the heel portions 36. Also the longest dimension of the oblate cross section of the filament in the leg portions 32 and 34 extends generally parallel the slots 22 and the strap portions 38 where the leg portions extend into the slots 22.

In operation of the slide fastener of FIG. 1, movement of the slider 30 bends the respective connecting elements 14 and 24 at points within the slider 30 such that the head portions 16 and 26 are spread apart at the bend within the slider 30 to allow engagement or disengagement between the head portions 16 and 26.

The strap portions 38 being formed at an oblique angle to the folded edge of the member 20 provide a stronger support for the heel portions 36 than if the strap portions were not formed at an oblique angle. The twisting of the strap portion 38 by the heel portions 36, being in the direction of the angle of the slots 22 from the perpendicular line 40, tends to open the looped strap portion 38 rather than to close the strap portions allowing for distribution of forces throughout the strap portions 38 instead of concentration at points along a side of each slot. Thus the strap portions 38 are more adapted to resist tearing due to crosswise force on the slide fastener.

Figures 5, 6:
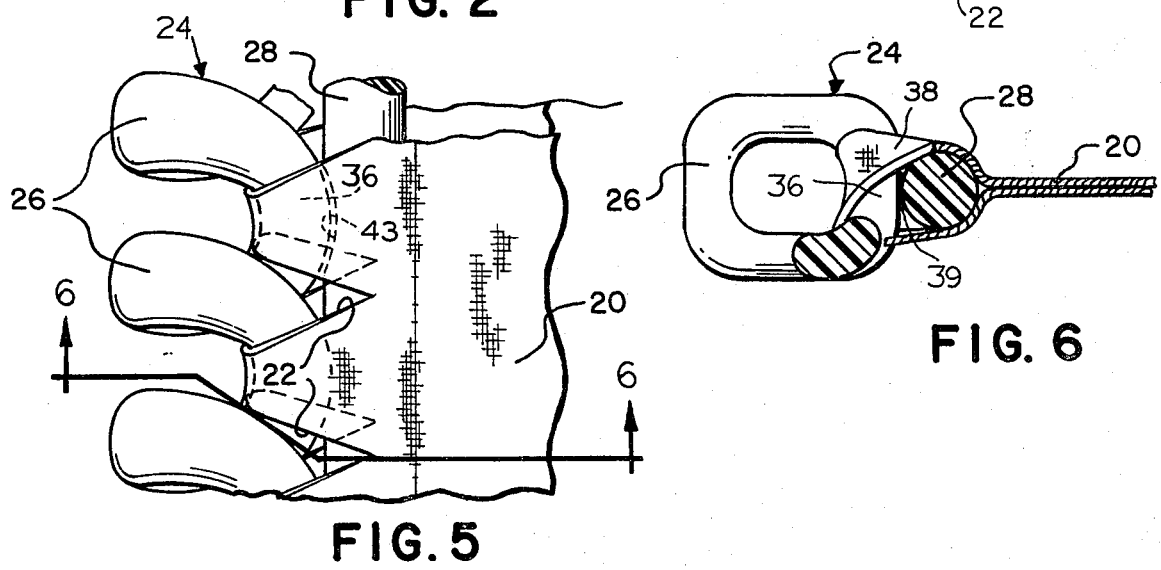
FIG. 5 is a plan view, similar to FIG. 2, of a modified stringer for a slide fastener in accordance with invention.
FIG. 6 is a cross section view taken along line 6—6 of FIG. 5.

In a modification shown in FIGS. 5 and 6, a cord 28 is disposed within the looped straps 38 engaging the outside curvatures of the heel portions 36. Preferably, the cord 28 is formed from a resilient material thus forming suitable seats 43 for the heel portions 36. The cord 28 particularly provides an improved stability to the coupling element 24 and allows the strap portion 38 to more securely hold the heel portions 36 to the member 20 due to the resilience of the cord 28. The cord 28 may also be secured to the heel portions 36 by a bond 39 formed by suitable means such as adhesives or thermoplastic materials welded together by ultrasonic or induction on localized susceptor materials (iron oxide and the like) by radiant energy. The bond 39 further improves the stability and security of the coupling element 24.

Figure 7:
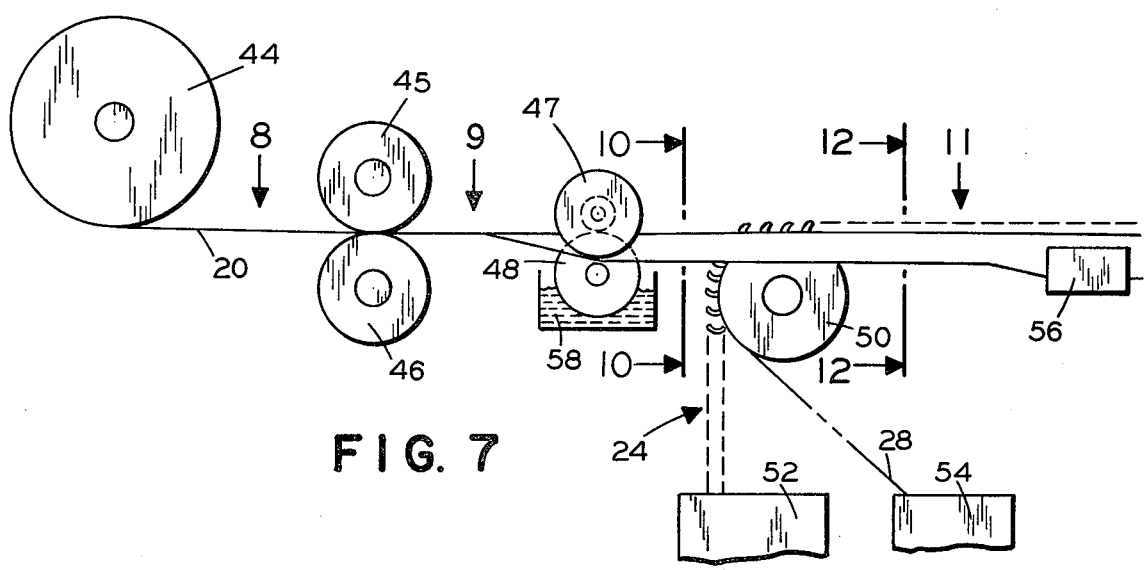
FIG. 7 is an elevation diagram illustrating a method and an apparatus for forming a slide fastener in accordance with the invention.
Figure 8:
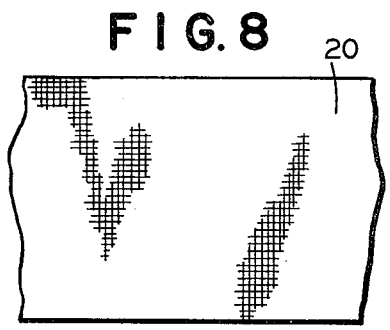
FIG. 8 is a top view taken from the viewpoint of arrow 8 in FIG. 7.
Figure 9:
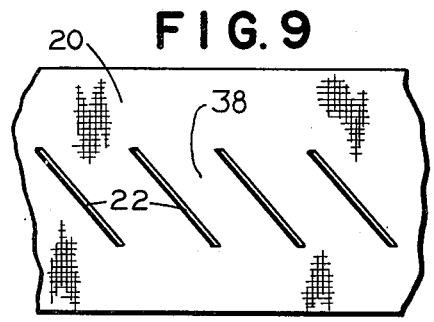
FIG. 9 is a top view taken from the viewpoint of arrow 9 of FIG. 7.
Figure 10:
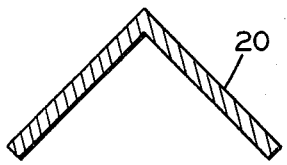
FIG. 10 is a cross section view taken along line 10—10 of FIG. 7.
Figure 11:
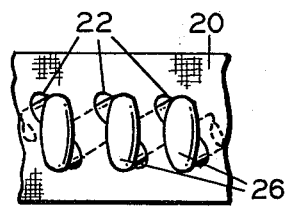
FIG. 11 is a top view taken from the viewpoint of arrow 11 of FIG. 7.
Figure 12:
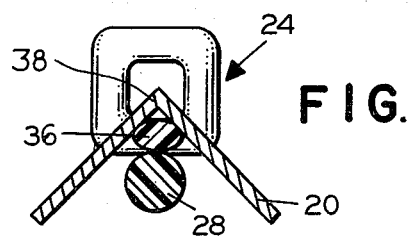
FIG. 12 is cross section view taken along line 12—12 of FIG. 7.

As illustrated in FIG. 7, a stringer for the slide fastener can be manufactured by an apparatus employing a method wherein the stringer is formed in a continuous line. A strip 20 of cloth-like material, as shown in FIG. 8, is fed from a supply reel 44 between rotary slitting wheels 45 and 46 to form the slots 22 extending at an oblique angle to the strip 20 and centrally disposed therein as shown in FIG. 9. Then the slotted strip is passed between crimping rollers 47 and 48 which bend the strip 20 into a V-shaped cross section as shown in FIG. 10. Subsequently, the crimed tape 20 is fed to an assembly wheel 50 which is suitably grooved to also receive the coil 24 from a coil supply 52 along with the cord 28 from a cord supply 54. The wheel 50 inserts the heads 26 from beneath the tape 20 through the slots 22 so that they protrude therefrom as shown in FIGS. 11 and 12. Also, the wheel 50 positions the cord 28 beneath the tape in engagement with the heel portions of the coil 24. Subsequently, the crimped tape 20 with the positioned coil 24 and cord 22 passes through a apparatus 56 which completes the folding of the halves of the tape 20 together as well as threadlessly bonding the halves of the tape together. The bonding may be performed by ultrasonics, thrermo-bonding, or, as shown in FIG. 7, by pressing the halves together which have previously been coated with an adhesive 58 by the roller 48. It addition to the halves of the tape being bonded together, the tape 20 and its strap portions 38 can also be bonded to the cord 28 and to the heel portions 36.

Since many variations, modifications, and changes in detail may be made to the described embodiments, it is intended that all matter shown in the foregoing description and in the accompanying drawing be interpreted as illustrative and not in a limiting sense.

What is claimed is:

1. A stringer for a slide fastener comprising
   a support member formed from a material folded at one edge and having opposite folded portions secured together;
   said support member having a plurality of spaced slots formed in the material transversely over the one edge defining looped strap portions extending over the one edge between the slots;
   said looped strap portions having a width substantially greater than the width of the slots;
   a spiral coupling element formed from a continuous filament into successive convolutions;
   each convolution having a head portion extending from the one edge of the support member for interlocking with opposing head portions, a pair of leg portions extending from opposite sides of the head portion into a respective slot in the one edge, and a heel portion extending through a looped strap portion and interconnecting to a leg portion of an adjacent convolution; and
   said slots being formed in the support member at an oblique angle to the one edge such that opposite halves of each slot receive the respective leg portions of each pair of leg portions at respective longitudinally spaced points on the one edge of the support member.

2. A stringer for a slide fastener as claimed in claim 1 including a cord extending longitudinally of the one edge between the opposite folded portions of the support member and secured in engagement with external surfaces of the heel portions of the spiral coupling element.

3. A stringer for a slide fastener as claimed in claim 2 wherein the cord is a resilient cord and the cord is deformed about the heel portions of the coupling element to form a seat therefor.

4. A stringer for a slide fastener as claimed in claim 2 wherein the cord is bonded to the heel portions of the spiral coupling element.

5. A stringer for a slide fastener as claimed in claim 1 wherein the strap portions are bonded to the heel portions.

6. A stringer for a slide fastener as claimed in claim 1 wherein the material is a felted fiber material.

7. A stringer for a slide fastener as claimed in claim 1 wherein the folded material is secured together by a threadless bond.

8. A stringer for a slide fastener as claimed in claim 6 wherein the folded material is secured together by a threadless bond.

9. A stringer for a slide fastener as claimed in claim 1 wherein the heel portions extend at an oblique angle to the plane of the support member, and the looped strap portions extend generally perpendicular to the heel portions.

10. A stringer for a slide fastener comprising a support member formed from a material folded at one edge and having opposite folded portions secured together;

said support member having a plurality of spaced slots formed in the material transversely over the one edge defining looped strap portions extending over the one edge between the slots;

a coupling element formed from a continuous filament into successive convolutions;

each convolution having a head portion extending from the one edge of the support member, a pair of leg portions extending from opposite sides of the head portion into a respective slot in the one edge, and a heel portion extending through a looped strap portion and interconnecting to a leg portion of an adjacent convolution; and a cord extending longitudinally of the one edge between the opposite folded portions of the support member and secured in engagement with external surfaces of the heel portions of the coupling element.

11. A stringer for a slide fastener as claimed in claim 10 wherein the cord is a resilient cord and the cord is deformed about the heel portions of the coupling element to form a seat therefor.

12. A stringer for a slide fastener as claimed in claim 10 wherein the cord is bonded to the heel portions of the spiral coupling member.

13. A stringer for a slide fastener as claimed in claim 11 which includes an adhesive bond between heel portions and the cord.

14. A slide fastener comprising a pair of stringers and a slider on the stringer for opening and closing the stringers wherein each stringer includes a carrier tape formed from a felted fiber material having longitudinal halves folded together about a longitudinal folded edge and secured by an adhesive;

said carrier tape having a plurality of spaced slots formed in the felted fiber material transverse over the folded edge defining looped strap portions extending over the folded edge between the slots;

said strap portions having a width substantially greater than the width of the slots;

a spiral coupling element formed from a continuous filament of oblate cross section into successive convolutions;

each convolution having a head portion extending from the one edge of the support member for interlocking with opposing head portions, a pair of leg portions extending from opposite sides of the head portion into a respective slot in the folded edge, and a heel portion extending through a respective looped strap portion and interconnecting to a leg portion of a contiguous convolution;

said heel portions extending transverse at an oblique angle to the plane of the tape-like supporting member;

said oblate cross section of the filament in the leg portions extending generally parallel the slots where the leg portions extend into the slots; and said slots extending at an oblique angle to the folded edge such that the looped strap portions extend generally perpendicular the the heel portions.

15. A stringer for a slide fastener as claimed in claim 1 wherein the continuous filament has an oblate cross section with the longest dimension of the cross section in the leg portions of the coupling element extending generally parallel to the slots where the leg portions extend into the slots.

* * * * *